United States Patent [19]
Choi

[11] Patent Number: 5,701,162
[45] Date of Patent: Dec. 23, 1997

[54] TELEVISION CHANNEL AURAL DISPLAY AND METHOD THEREOF

[75] Inventor: Chang Won Choi, Kyungsangbuk-do, Rep. of Korea

[73] Assignee: LG Semicon Co., Ltd., Chungcheongbuk-do, Rep. of Korea

[21] Appl. No.: 541,773

[22] Filed: Oct. 10, 1995

[30] Foreign Application Priority Data

Oct. 7, 1994 [KR] Rep. of Korea ............. 25720/1994

[51] Int. Cl.⁶ ..................................................... H04N 5/44
[52] U.S. Cl. ...................... 348/570; 348/567; 348/553
[58] Field of Search ............................ 348/569, 570, 348/553, 563, 374; 455/156.1, 154.1

[56] References Cited

U.S. PATENT DOCUMENTS

| | | | |
|---|---|---|---|
| 4,392,246 | 7/1983 | Niioka et al. | 455/156.1 X |
| 5,220,681 | 6/1993 | Belgin | 455/156.1 |
| 5,479,266 | 12/1995 | Young et al. | 34/906 X |
| 5,517,254 | 5/1996 | Monta et al. | 348/906 X |
| 5,524,051 | 6/1996 | Ryan | 455/151.1 |

FOREIGN PATENT DOCUMENTS

| | | | |
|---|---|---|---|
| 137726 | 10/1981 | Japan | 455/156.1 |
| 65920 | 4/1982 | Japan | 455/156.1 |
| 58-0050202 | 1/1983 | Japan | H03J 1/02 |
| 226521 | 12/1984 | Japan | 455/156.1 |
| 135927 | 5/1990 | Japan | 455/156.1 |
| 7164 | 1/1993 | Japan | 455/156.1 |

*Primary Examiner*—John K. Peng
*Assistant Examiner*—Nathan J. Flynn
*Attorney, Agent, or Firm*—Morgan, Lewis and Bockius, LLP

[57] ABSTRACT

A television channel display comprises remote controller signal receiver for receiving a channel number determined by a user, an MCU for receiving a signal output from the remote controller signal receiver, a memory for storing and outputting audio signals of the channel number and a broadcasting station name according to a control signal output from the MCU, an audio mixer for mixing the audio signal of the channel number and the broadcasting station name output from the memory, an aural processor for processing audio signals of an input broadcasting program, a multiplexer for selecting and outputting the audio signals of the audio mixer and the aural processor under a control of the MCU, and a speaker for converting and outputting audio current outputs from the multiplexer into an audio signal.

4 Claims, 3 Drawing Sheets

5,701,162

TELEVISION CHANNEL AURAL DISPLAY AND METHOD THEREOF

BACKGROUND OF THE INVENTION

1. Field of the Invention

The present invention relates to a television channel display, and more particularly, to a television channel display and method thereof in which, in selecting a channel, the channel number and the name of the broadcasting station are aurally output to facilitate a user's selecting broadcasting channels.

2. Discussion of the Related Art

A conventional television channel selecting apparatus and method is shown in FIG. 1. This apparatus consists of a remote controller signal receiving portion 1 for receiving a channel number signal determined by a user and output from a remote controller (not shown), an MCU 2, e.g., a master or microprocessor control unit, for decoding a code output from remote controller signal receiving portion 1, on-screen-display-processing the selected channel number, and controlling an EEPROM 3 and aural processing portion 4, EEPROM 3 controlled by MCU 2 and for outputting stored volume, image, and channel data to MCU 2, aural processing portion 4 for controlling, processing and amplifying the volume of a channel-selected aural signal according to the volume control data stored in EEPROM 3, and a speaker 5 for outputting the aural signal amplified and output from aural processing portion 4. The operation of the conventional television channel selecting apparatus will be discussed below.

When a user selects a desired channel number via the remote controller, remote controller signal receiving portion 1 receives a code output from the remote controller and outputs it to MCU 2. MCU 2 receives the code output from remote controller signal receiving portion 1, decodes the code, performs OSD-processing thereof, and outputs a control signal to EEPROM 3 and aural processing portion 4. EEPROM 3 receives the control signal from MCU 2, outputs data of stored volume, image and channel to MCU 2, and, when power is ON, outputs volume control data to aural processing portion 4 to control the initial volume when power is ON.

Receiving the control signal of MCU 2 and the volume control data for initial power-on from EEPROM 3, aural processing portion 4 amplifies the synchronized and detected audio currents. Receiving the audio current amplified in aural processing portion 4, speaker 5 converts the audio current into an aural signal.

The conventional television system OSD-processes a corresponding channel according to the user's selection. However, the channel of a broadcasting station is varied according to areas so that the conformation between channel and broadcasting station is difficult. If the user does not remember corresponding channels for broadcasting stations, it is difficult to select a desired channel.

SUMMARY OF THE INVENTION

Accordingly, the present invention is directed to a television channel aural display and method thereof that substantially obviates one or more of the problems due to limitations and disadvantages of the related art.

Therefore, it is an object of the present invention to provide a television system for setting a specific channel number and the name of broadcasting station in accordance with programming areas, and aurally outputting the channel number and broadcasting station (for example, this is MBC for channel 11), facilitating the user's selection of a desired channel number and broadcasting, without a need for directly viewing the television screen.

Additional features and advantages of the invention will be set forth in the description which follows, and in part will be apparent from the description, or may be learned by practice of the invention. The objects and other advantages of the invention will be realized and attained by the structure particularly pointed out in the written description and claims hereof as well as the appended drawings.

To achieve these and other advantages and in accordance with the purpose of the invention, as embodied and broadly described, a television channel aural display and method thereof of the present invention includes a remote controller signal receiving portion for receiving a channel number determined by a user, an MCU for receiving a signal output from the remote controller signal receiving portion and controlling respective portions, a memory for storing and outputting the audio signals of channel number and broadcasting station name according to a control signal output from the MCU, an audio mixer for mixing the audio signal of the channel number and broadcasting station name output from the memory, an aural processing portion for processing the audio signal of an input broadcasting program, a multiplexer for selecting and outputting the audio signals of the audio mixer and the aural processing portion under the control of the MCU, and a speaker for converting and outputting audio currents output from the multiplexer into an audio signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
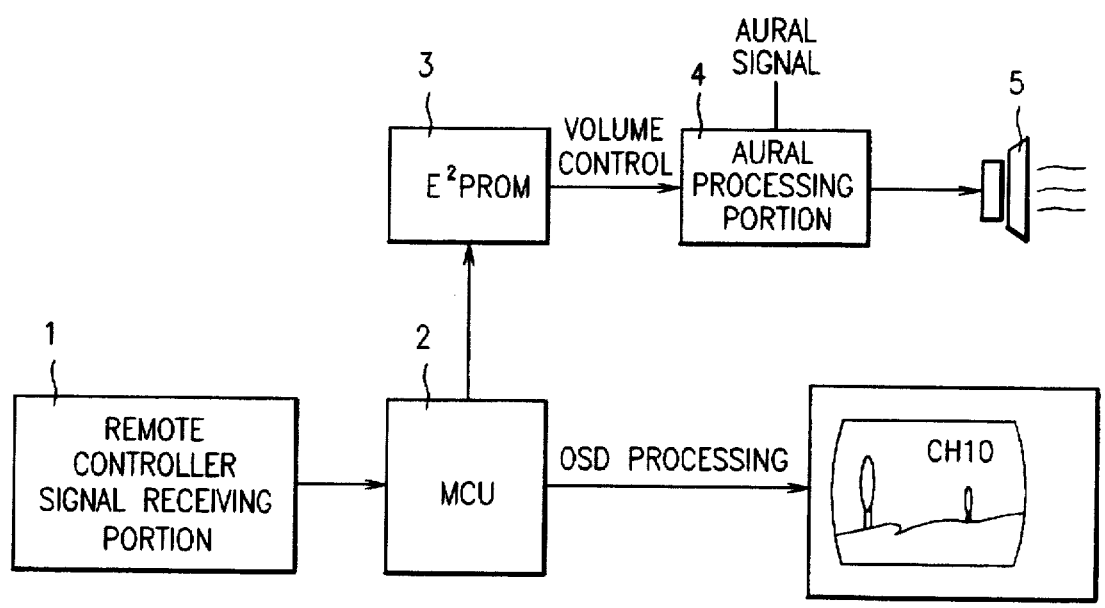
FIG. 1 is a schematic block diagram of a conventional television system.
Figure 2:
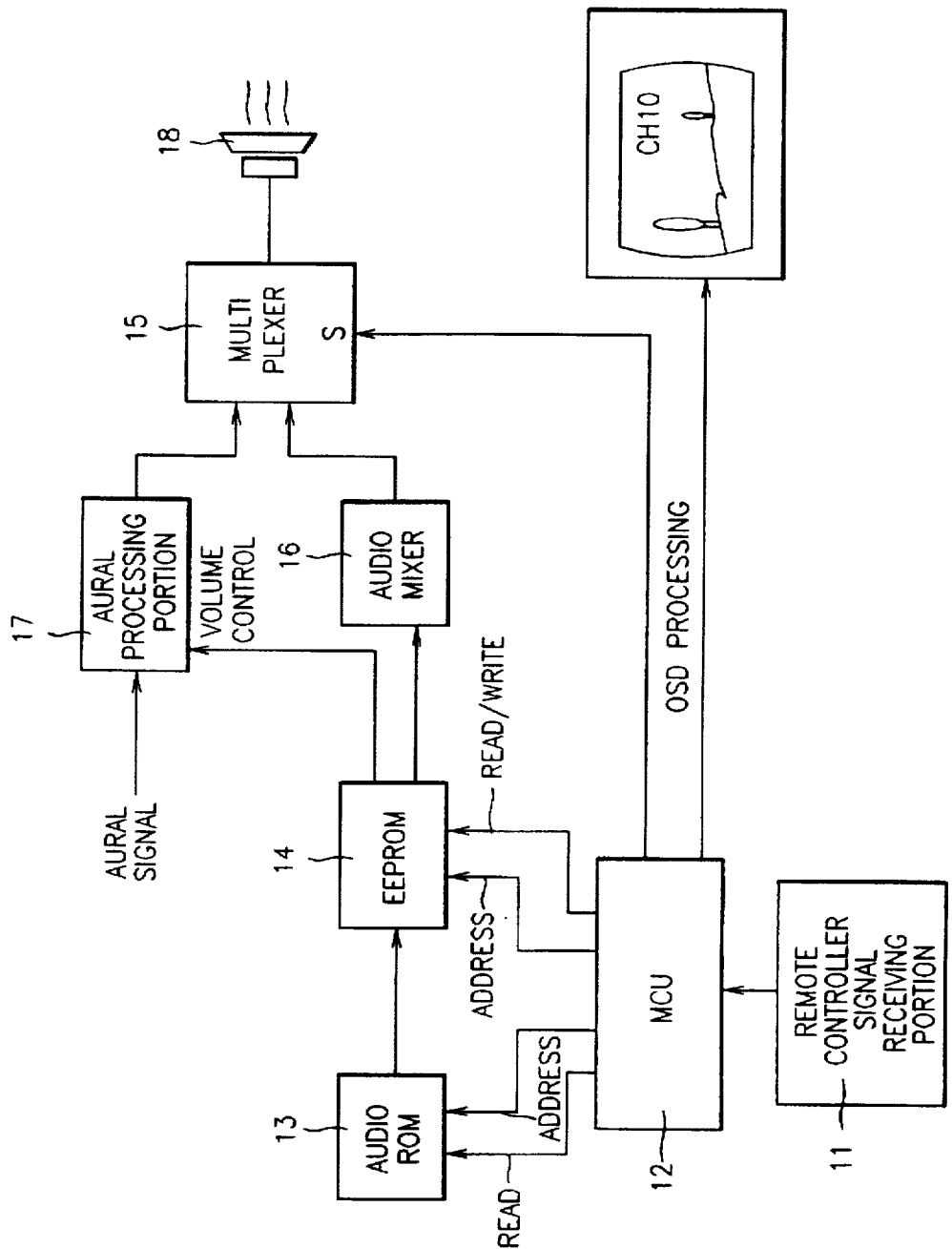
FIG. 2 is a schematic block diagram of a television system of the present invention.

As shown in FIG. 2, a television channel aural display of the present invention comprises a remote controller signal receiving portion 11 for receiving a channel number selected by a user via a remote controller, an audio ROM 13 for storing the aural signal of a channel number and broadcasting station name, an EEPROM 14, a nonvolatile memory, for receiving the data of audio ROM 13 and storing data just prior to power-off, an MCU 12 coupled to remote controller signal receiving portion 11 and for controlling audio ROM 13, EEPROM 14, and a peripheral circuit (not shown) for OSD-processing a corresponding channel number, an audio mixer 16 for receiving and mixing the aural signal of the corresponding channel number and broadcasting station, with audio ROM 13 and EEPROM 14 being enabled, an aural processing portion 17 for controlling the volume of a broadcast program according to the user's volume control and outputting an aural signal, a multiplexer 15 for receiving the control signal of MCU 12 via its select port and selecting and outputting the audio signal of audio mixer 16 and the audio signal of aural processing portion 17, and a speaker 18 for externally transmitting the selected audio signals. The operation of the television channel display of the present invention will be described below in detail.

When a remote controller signal receiving portion 11 receives an instruction to select a specific channel, the peripheral circuit of MCU 12 OSD-processes the number of a corresponding channel on the screen. The aural signals of the selected channel number and broadcasting station are mixed in audio mixer 16 via audio ROM 13 and EEPROM 14.

Receiving the control signal of MCU 12 through its select port, multiplexer 15 outputs the aural signal of audio mixer 16 to speaker 18 for a predetermined period during channel conversion or power-on. After the predetermined period, the aural signal output from audio processing portion 17 is output to speaker 18.

After the aural signals of the channel number and broadcasting station selected by the user are output to speaker 18, multiplexer 15 outputs to speaker 18 the aural signal of a program corresponding to the selected channel. In other words, the aural signal of audio processing portion 17 is output to speaker 18 by the switching of the multiplexer. A method of setting the number of a specific channel and the name of a broadcasting station to the television system will be described below as shown in FIG. 3.

Figure 3:
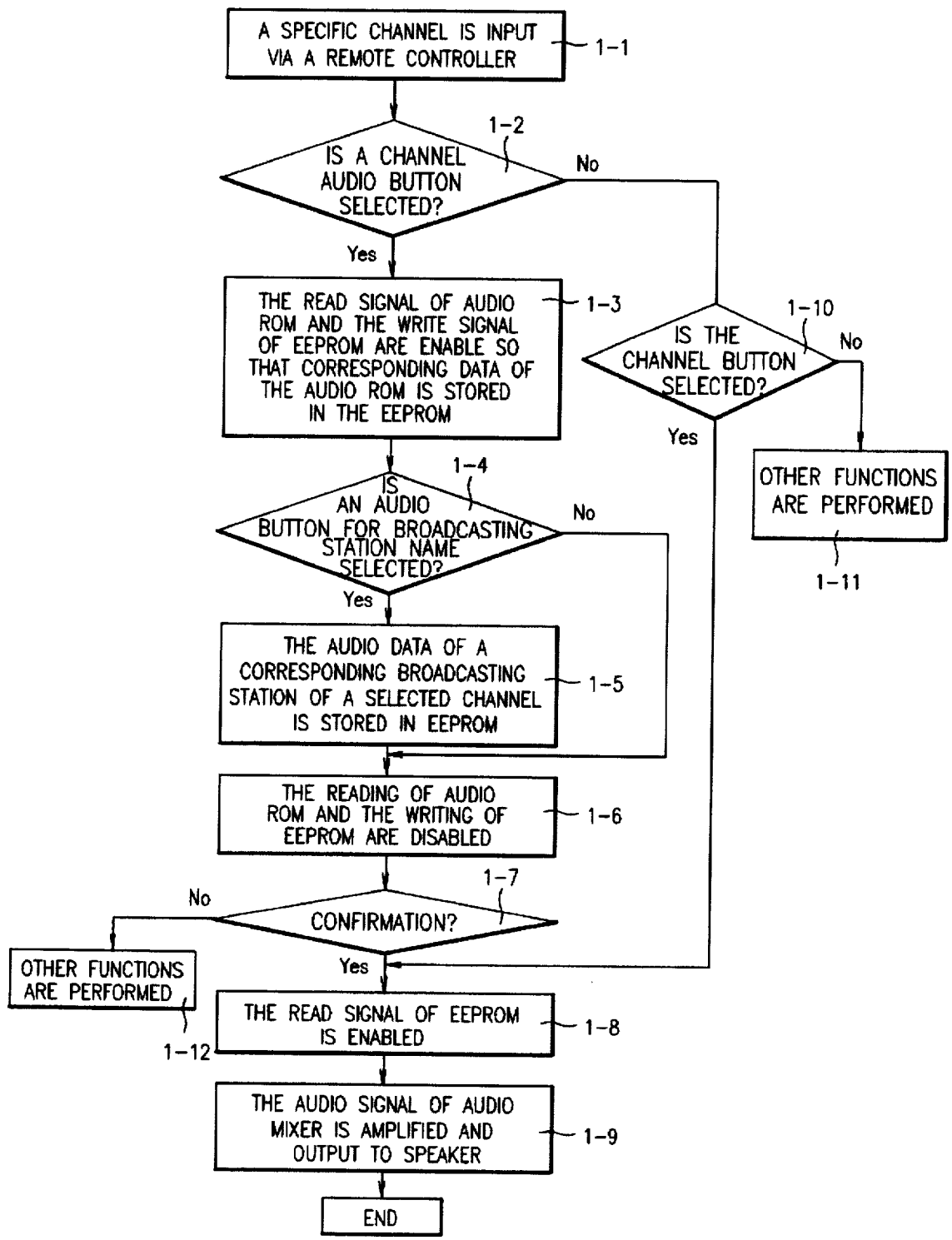
FIG. 3 is a flowchart of explaining the setting of a specific channel number and the name of a broadcasting station.

As shown in FIG. 3, in order to select the number of a specific channel number and the name of a broadcasting station, the specific channel is input via a remote controller (externally) in step 1—1. In step 1–2, it is decided whether a channel audio button is selected or not. When the channel audio button is selected and pressed, the read signal of audio ROM 13 and the write signal of EEPROM 14 are enabled by MCU 12 so that corresponding data of the audio ROM are stored in the EEPROM in step 1–3. Here, the addresses of audio ROM 13 and EEPROM 14 are different for channels. Data of audio ROM 13 having the address of an aural signal corresponding to a channel are accessed and stored in the EEPROM.

In step 1–4, it is determined whether an audio button for broadcasting station name is selected or not. When the audio button for broadcasting station name is selected and pressed, the audio data of a corresponding broadcasting station of a selected channel are stored in EEPROM 14 in step 1–5. In step 1–6, the reading of audio ROM 13 and the writing of EEPROM 14 are disabled.

In step 1–7, it is determined whether a confirmation button is selected or not in order to enable the read signal of EEPROM 14. When the confirmation button is selected and pressed, the read signal of EEPROM 14 is enabled in step 1–8 so that the data of a corresponding channel number and a broadcasting station name are input and mixed in audio mixer 16. Here, according to the control of MCU 12, the audio signal of audio mixer 16 is amplified and output to speaker 18 via its select port of multiplexer 15 in step 1–9.

In step 1–2, if a channel audio button is not selected, the channel voice is not changed. In step 1–10, it is decided whether a channel in which the voice of the channel number and the broadcasting station name is set is selected or not. When the set channel number and the broadcasting station name are selected, the read signal of the EEPROM is enabled in step 1–8 and the succeeding process is performed. If not, other functions are performed in step 1–11.

It is determined whether the audio button of broadcasting station name is selected or not in step 1–4. If not, this indicates that the broadcasting station name is not changed. Then, the reading of audio ROM and the writing of the EEPROM are disabled. In order to enable the read signal of the EEPROM, it is determined whether the confirmation button is selected or not in step 1–7, then the succeeding process is performed. If the confirmation button had not been pressed in step 1–7, where it is determined whether the confirmation button is selected or not, other functions are performed in step 1–12 in order to enable the read signal of EEPROM 14.

As described above, in the present invention, the number of channel and the name of broadcasting station selected by a user are aurally output, allowing a desired channel and broadcasting to be selected without viewing the television screen.

It will be apparent to those skilled in the art that various modifications and variations can be made in the television channel aural display and method thereof of the present invention without departing from the spirit or scope of the invention. Thus, it is intended that the present invention cover the modifications and variations of this invention provided they come within the scope of the appended claims and their equivalents.

What is claimed is:

1. A television channel display comprising:
   remote controller signal receiving means for receiving a channel number selected by a user;
   a micro computer unit (MCU) for receiving a signal output from the remote controller signal receiving means;
   a memory for storing an audio signal of the selected channel number and a broadcasting station name and for outputting the stored audio signal in response to a control signal output from the MCU, wherein the memory comprises an audio ROM for storing the audio signal of the channel number and the broadcasting station name and an EEPROM for receiving data from the audio ROM and storing the data just prior to a power-off;
   an audio mixer for mixing the audio signal of the channel number and the broadcasting station name output from the memory;
   an aural processor for processing audio signals of the selected broadcasting program;
   a multiplexer, responsive to the MCU, for selectively outputting the audio signal from the audio mixer and the audio signals from the aural processor; and
   a speaker for receiving the output from the multiplexer and for converting the received output into a speaker audio signal.

2. A method of displaying a television channel with a remote controller having a button of broadcasting station name and a channel audio button, the method comprising the steps of:
   receiving a specific channel via the remote controller;
   determining whether or not the channel audio button is selected;
   enabling a read signal of an audio ROM and a write signal of an EEPROM;

storing corresponding data of the audio ROM when the channel audio button is selected;

determining whether or not the button of broadcasting station name is selected;

storing audio data of a corresponding broadcasting station of a selected channel in the EEPROM when the button of broadcasting station name is selected;

disabling a reading of the audio ROM and a writing of the EEPROM, and confirming a result;

enabling a read signal of the EEPROM after a confirmation button is selected; and providing corresponding data of the EEPROM to an audio mixer.

3. A method of displaying a television channel with a remote controller comprising the steps of:

receiving a specified channel via the remote controller;

providing channel number data corresponding to the specified channel from an audio ROM to an EEPROM if selected;

providing audio data corresponding to a broadcasting station of the specified channel to the EEPROM if selected; and processing the channel number data and the audio data of the EEPROM for a final output.

4. The method of claim 3, wherein the step of processing the channel number data and the audio data of the EEPROM comprises the steps of:

providing the channel number data and the audio data of the EEPROM to an audio mixer;

providing an output from the audio mixer to a multiplexer;

providing an output from an aural processor to the multiplexer; and providing an output from the multiplexer to a speaker.

* * * * *